Jan. 2, 1934.  E. B. KILLEN  1,942,296
CUSHION AND LIKE DEVICE
Filed May 16, 1932   2 Sheets-Sheet 1
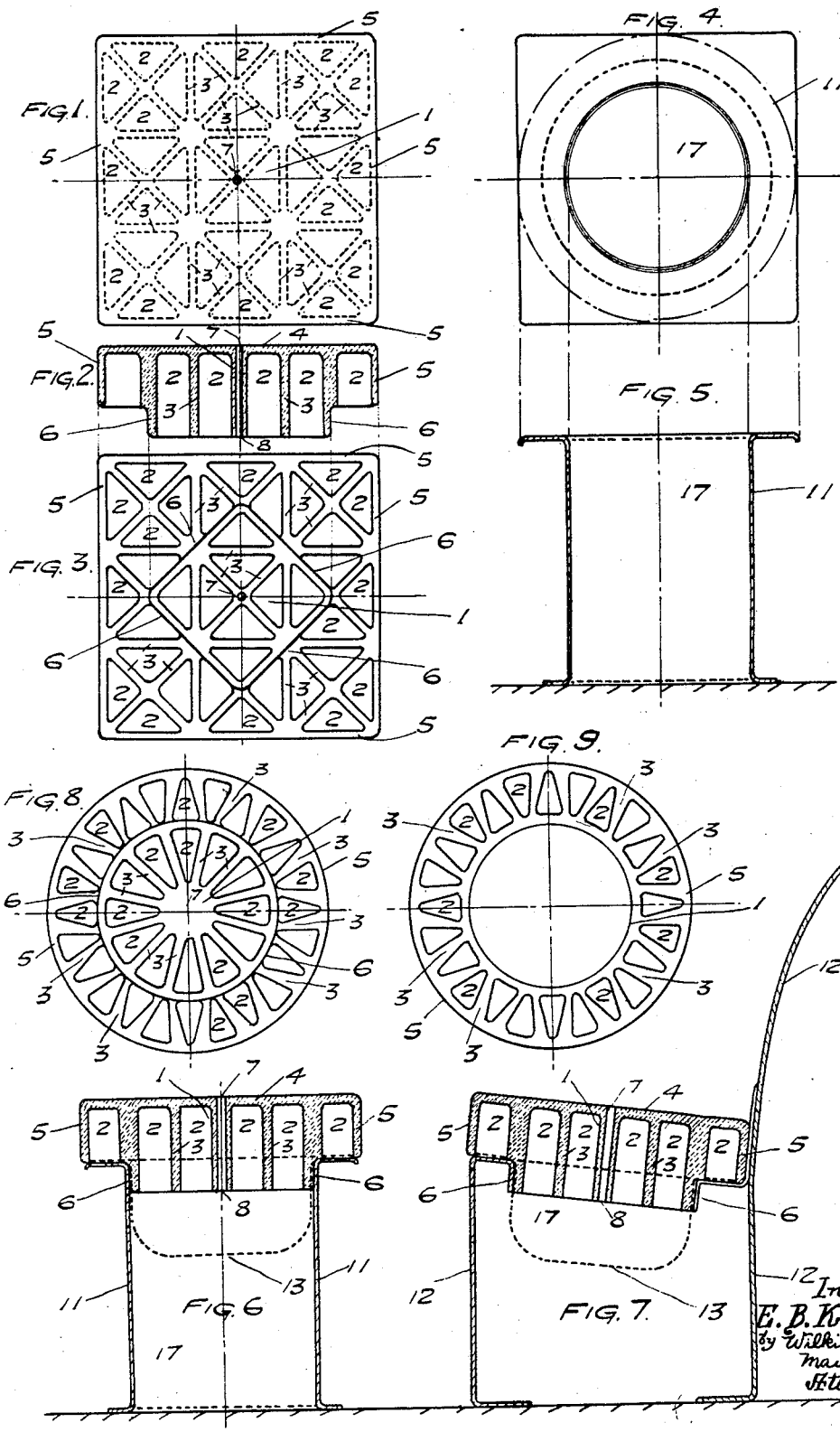

Jan. 2, 1934.    E. B. KILLEN    1,942,296
CUSHION AND LIKE DEVICE
Filed May 16, 1932    2 Sheets-Sheet 2
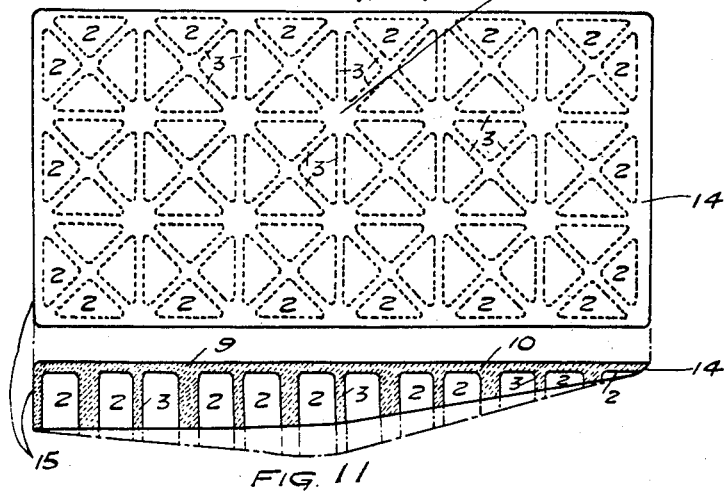
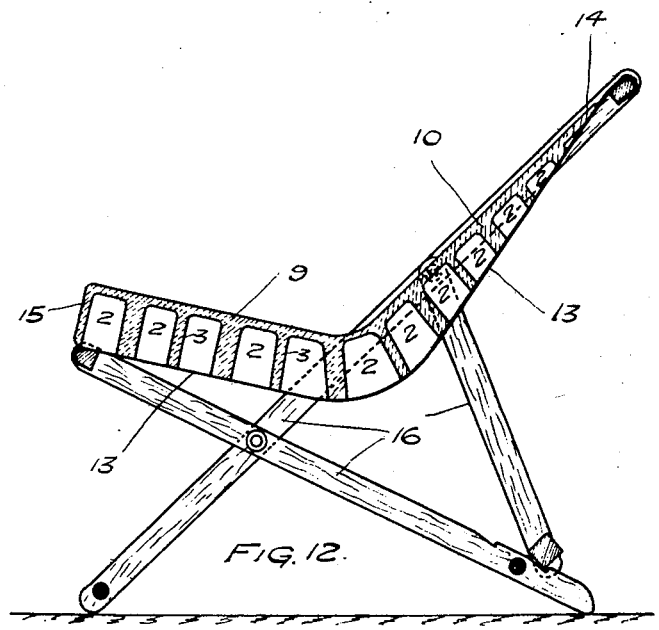
Inventor
E. B. Killen
by Wilkinson & Mawhinney
Attorneys.

Patented Jan. 2, 1934

1,942,296

UNITED STATES PATENT OFFICE 1,942,296

CUSHION AND LIKE DEVICE

Edward Brice Killen, London, England

Application May 16, 1932, Serial No. 611,664, and in Great Britain May 28, 1931

1 Claim. (Cl. 155—179)

This invention relates to an improved moulded or cast luxury-giving rubber-and-air box device which is constructed having a suitable number of, preferably triangular-like, air compartments, surrounded by a suitable top and side and inner rubber-and-air walls, which walls I will call rubber and air cellular walls, all homogeneously manufactured together to form a unit abnormally strong light rubber-and-air box device for a given work.

One advantage of this invention is that it permits an abnormally soft and luxury-giving rubber-and-air box device to be manufactured by any well known process or processes when making use of say ordinary or concentrated latex rubber or suitable mixings, to be used with or without an outer cover part and without any risk of my novel rubber-and-air box cushion part being permanently distorted when in use.

One object of this invention is to utilize efficiently and advantageously two light and cheap essential elements, namely air and rubber (or its equivalent) in the construction of a novel soft, light and strong unit rubber-and-air box structure for general and universal utility in many different shapes and dimensions and at a low production cost.

Another object of the invention is to manufacture a unit luxury-giving rubber-and-air box cushion device which is used in combination with a suitable apertured frame part, a combination which permits the luxury-giving shock absorbing qualities of my rubber-and-air box cushion part to be enhanced say 50% to 100% according to the type and fitment of the two parts.

Another object is to manufacture my unit luxury-giving rubber-and-air box device in combination with a suitable apertured frame part to replace standard chairs, settees, and the like, at a low production cost, which invention improves the luxury-giving qualities of chairs, settees and such-like structures.

Another object is to manufacture a combined luxury-giving rubber-and-air box cushion part and apertured frame part, the two when combined forming a super luxury-giving structure which comprises two essential parts, namely a luxury-giving light and soft rubber-and-air box cushion part and a suitable frame part, the whole being manufactured in all required dimensions and of suitable materials.

With the above and other objects in view, one feature of this invention is the construction of a rubber-and-air box cushion device which comprises many, preferably triangular-like, compartments which are all surrounded by soft endless strong rubber and air cellular walls, the rubber-and-air box cushion device having a suitable flexible top and deep vertical unbroken side and inner walls which form a unit luxury-giving cushion structure, the whole being moulded or cast from a suitable latex or the like mixing aerated before cure.

According to a further feature of this invention the rubber-and-air box cushion structure has a lower or bottom part of lesser cross-sectional dimensions than its top part, the—preferably triangular-like—air compartments being formed from deep vertical unbroken endless rubber and air cellular walls of suitable thickness.

According to a still further feature of the invention my rubber-and-air box cushion device may comprise deep vertical air compartments of any shape or formation, say square or round, which are surrounded by unbroken endless rubber and air cellular walls of suitable thickness, the rubber-and-air box structure having a greater dimensioned upper part and a lesser-dimensioned bottom or lower part in cross-section, the flexible rubber-and-air box cushion part having also when wanted a suitable central hole part which central hole extends from the top or upper part to the bottom or lower part of the luxury-giving rubber-and-air box structure.

According to a still further feature of the invention I construct a luxury-giving non-collapsible pneumatic cushion structure which comprises (1) an inner luxury-giving non-collapsible unit rubber-and-air box part which has air compartments surrounded by deep vertical unbroken endless rubber and air cellular walls, with (2) an outer cover part.

According to a still further feature of the invention I construct a luxury-giving non-collapsible pneumatic cushion seat (or such-like structure) which comprises (1) an inner luxury-giving non-collapsible unit rubber-and-air box part which has air compartments surrounded by deep vertical unbroken endless rubber and air cellular walls, with (2) an outer cover part and (3) an associated frame part.

In order that the invention may be clearly understood and readily carried into effect the same will now be described more fully with reference to the accompanying drawings in which Figure 1 shows in plan the top of a square form of my luxury-giving rubber-and-air box device constructed in accordance with this invention, having triangular-like air compartments all surrounded by deep vertical unbroken endless rubber and air cellular walls.

Figure 2 shows a vertical cross-sectional view of the same rubber-and-air box device as shown in Figure 1.

Figure 3 shows in plan the bottom of one form of my luxury-giving rubber-and-air box device having a lower or bottom portion formed on the square rubber-and-air box cushion for fitment into a suitable apertured frame part.

Figure 4 shows in plan one type of a metal apertured frame part into which the lower portion of my soft luxury-giving rubber-and-air box cushion part is fitted.

Figure 5 shows a vertical cross-sectional view of one type of a metal frame part as shown in Figure 4.

Figure 6 shows a vertical cross-sectional view of a form of my soft luxury-giving rubber-and-air box cushion as shown in Figures 1, 2 and 3 fitted in position to one type of apertured frame part.

Figure 7 shows a vertical cross-sectional view of the same rubber-and-air box cushion fitted in position to one type of suitable chair frame.

Figure 8 shows in plan one type of a round rubber-and-air box cushion having triangular-like air compartments all surrounded by deep vertical unbroken endless rubber and air cellular walls and having a lower bottom circular portion of lesser dimensions, which lower lesser-dimensioned circular part is fitted into a hole formed in a suitable apertured frame part as shown in Figures 4, 5, 6 and 7.

Figure 9 shows in plan another type of round rubber-and-air box cushion having triangular-like air compartments all surrounded by deep vertical unbroken endless rubber and air cellular walls, the rubber-and-air box being formed in ring or annular shape and without having any lower or bottom part of less cross-sectional diameter or width.

Figure 10 shows in plan one form of the top of an oblong rubber-and-air box cushion having triangular-like air compartments surrounded by strong unbroken endless flexible rubber and air cellular walls constructed and adapted for many purposes and for use on say a deck chair.

Figure 11 shows a vertical cross-sectional view of the oblong rubber-and-air box cushion shown in Figure 10 and shown in varying cross-sectional thicknesses in full and dotted lines.

Figure 12 shows a vertical cross-sectional view of the rubber-and-air box cushion as per Figure 11 in full lines in position upon say a canvas or other type of deck chair held in position by means of, say, a suitable strap or in any other well-known manner.

In this invention I make use of a soft and light rubber-and-air box cushion device 1 having a required number of preferably triangular-like in shape air compartments 2 by means of my deep vertical unbroken endless rubber and air cellular walls 3 of suitable thickness, which air compartments 2 are suitably formed within my rubber-and-air box part 1 to sensitively support in any required position a human body in comfort and luxury when used as a cushion or seat or mattress or such-like device with or without an extra outer cover part as desired.

The luxury-giving rubber-and-air box part 1 may be constructed in any desired shape to form a light and soft luxury-giving cushion for a seat, mattress, sofa, or the like part so as to obtain a maximum luxury, comfort and safe vertical deflection wherever required and without any risk of collapse or objectionable lateral roll when in use and constructed to be suitably mounted and tilted in any required position on a suitable frame part to support a human body safely in super luxury and comfort.

This invention may be used to replace many standard types of sponge-like cushions in use today, including well-known types of sponge rubber seating devices which have been in use for many years and which seating devices make use of a comparatively heavy well-known sponge rubber material manufactured from dry or hard rubber.

By means of this invention I manufacture what I call an improved rubber-and-air box device which is a new and improved unit rubber-and-air box product moulded from a suitable latex rubber (or the like) mixing (or mixings) which is aerated before moulding and before curing and is a better and lighter and stronger product than any well-known sponge rubber material which requires a much greater weight of material for a given work and is aerated during its cure and manufactured from hard or dry rubber instead of from a suitable latex rubber mixing. My improved rubber-and-air box structure has great and universal utility as compared with any type of well-known sponge rubber cushion structure manufactured in the past, for the reasons stated above. This rubber-and-air box invention has many advantages and new technical effects unobtainable by any other previous rubber sponge seating invention. In fact even if wanted this rubber-and-air box invention could not be moulded from hard or dry rubber and could not make use of any well-known heavier sponge rubber material manufactured from dry or solid rubber. This novel invention has the following advantages:—

(1) My unit rubber-and-air box structure is abnormally light for a given work and has the essential number of strong unbroken endless vertical light rubber and air cellular walls required to carry its load.

(2) My unit rubber-and-air box structure is easily and cheaply moulded or cast before its cure in all required shapes, constructions, and dimensions, having air compartments of the same or varying sizes in my unit rubber-and-air box structure for any required purpose for use without using either canvas or an outer cover part.

(3) My rubber-and-air box structure has deep vertical rubber and air cellular walls which form deep vertical, preferably triangular-like, air compartments, all the deep vertical walls being light, strong, endless and unbroken.

(4) My rubber-and-air box structure has no weakening recess parts or recess edges formed in its deep and strong vertical rubber and air cellular walls and no canvas in its construction for fitment to a suitable frame part.

(5) My rubber-and-air box structure has say 50% to 100% increased vertical deflection (or shock absorbing qualities) with increased lateral stability when used in combination with a suitable apertured frame part either with or without an outer cover part.

(6) My rubber-and-air box structure is easily and cheaply moulded using light and cheap moulds and an easy heat cure.

(7) My rubber-and-air box structure is manufactured vermin-proof and non-inflammable and when wanted water-proof for any special purpose.

(8) My rubber-and-air box structure is odourless.

My rubber-and-air cushion structure 1 in one form of this invention makes special use of two main parts, namely a unit light and soft flexible rubber-and-air box part 1 as described above (with or without a suitable outer cover part) in combination with a suitable frame part, to support the human body luxuriously and safely.

This invention is specially suitable for use in road vehicles, ships and aircraft moving at high speeds and wherever supercomfort is wanted with lateral stability, say when a vehicle is turning a corner at high speeds.

My rubber-and-air box part may be treated after manufacture in any well-known manner and by any well-known process or processes to render same absolutely non-inflammable and its porous outer skin surfaces may be rendered non-porous when wanted for any special work or purpose and without interfering with its soft and abnormally sensitive luxury-giving properties.

In my flexible rubber-and-air box part 1 I may have say 12 to 36 or more air compartments according to the load to be carried, all homogeneously connected together in manufacture, having a suitable top and side and inner rubber and air cellular unbroken endless walls to form my unit rubber-and-air box device.

The rubber-and-air box part 1 may have fitted over it any suitable type of waterproof outer cover to give to my luxury-giving light and soft rubber-and-air box cushion part any desired appearance and/or colour wanted and to exclude light and prevent its porous skin construction absorbing water or other liquid substance.

By means of this invention I am able to manufacture luxury-giving rubber-and-air box seats and other constructions or devices of universal utility which can be used to give luxury and comfort to passengers travelling on land or sea or in the air when making full use of my rubber-and-air box structure in combination with a suitable frame part. My rubber-and-air box part may when necessary have a suitable attachment strap part so that it can be attached to a human body for use quickly in case of a disaster at sea when used say on ships, instead of using a standard life-belt fitment, but when my rubber-and-air box device is used as a lift-belt device its porous rubber walls or the air cellular skin surfaces of the walls 3 must be suitably treated after manufacture to render them non-porous by say dipping or suitably painting the rubber-and-air box structure in any suitable and well-known effective manner.

My rubber-and-air box part 1 may be manufactured for fitment within standard or other suitable outer cushion covers, and when this invention is made full use of there may be no difference in the appearance of my luxury-giving cushion or seat from the appearance of many cushions or seats in use to-day.

My rubber-and-air box 1 may also be manufactured as a very light luxury-giving easily carried cushion structure say with a cover part having a handle strap and be constructed to look more or less like a lady's dressing case and then used as an extra luxury-giving cushion seat device when the owner is travelling in say an uncomfortable road-vehicle or train or boat.

The unbroken endless and recessless rubber and air cellular walls 3 of my rubber-and-air box 1 may be constructed say half-an-inch thick in widely different designs and shapes and in suitable colours for any required work when surrounding the necessary number of air compartments all having the necessary strength, durability and flexibility wanted for their required work.

The various designs may include a cushioning device of this type to present a square, round or rectangular shaped top 4 having the continuous flange 5 formed in the outer cellular walls 3 projecting downwardly at a right angle to the top. The inner cellular walls 3 provide a reduced portion or base having a continuous flange 6 to project downwardly from the top further than the flange 5.

It is to be noted that the, preferably triangular-like, air compartments have advantages which square, round, and other shaped air compartments have not got and that such triangular-like air compartments permit square, oblong and suchlike shaped rubber-and-air box devices to be easily moulded in abnormally-large rubber-and-air structure blocks in mass production to cheapen production cost and after moulding they can easily be cut up into many smaller sections for fitment to many different types and dimensions of seats and frames in use to-day, or the large moulded blocks instead of being cut into smaller sections after manufacture may be moulded in smaller rubber-and-air cushion structures by suitably partitioning the large mould when the necessary, say, parallel rubber and air cellular walls can be say about half-an-inch thick instead of say one inch thick and do not need to be cut in two after manufacture. When large blocks of my rubber-and-air box devices are manufactured in what I call mass production for cheapening production costs and some of the internal parallel-running walls are increased in thickness from say half-an-inch thick to say about one inch thick, these stronger thicker cellular walls may be suitably cut in two to form half-inch thick walls in any well-known or suitable manner when cutting up the large moulded blocks of rubber-and-air cushion structures into smaller sizes or dimensions for widely-different frames or purposes.

The large square formation as illustrated in my rubber-and-air box which is constructed having four triangular-like compartments in each square suit and facilitate mass production of my soft and light cushion structures at a low production cost, as described above.

When the base or lower parts the reference 6 of my rubber-and-air box device 1 are manufactured in suitably reduced dimensions for positioning and attachment to a suitable apertured frame part, a suitable attachment strap or band may be used to hold my rubber-and-air box part securely to its suitable frame part.

In my rubber-and-air box part 1 a suitable central hole part is preferably manufactured which runs from the top 4 to the bottom cushion part 8 of my flexible rubber-and-air box device 1, which central hole 7 permits a suitable attachment cord or the like fitment to be used to hold the flexible cushion part in correct position to its frame part.

The cellular air and rubber walls 3 of my rubber-and-air box part 1 although preferably manufactured to form triangular-like air compartments may be manufactured to form say square or round or other cavity shapes having say blunt or acute angles as desired and also, say, having a wider upper top part with a narrower lower bottom part for fitment into an apertured frame-part.

In this specification I describe in detail the novel construction and application of my rubber-and-air box part 1, but it will be apparent to those skilled in the art that various modifications and changes may be made without departing from the spirit of the invention. As an illustration, I may use any suitable type and shape of rubber-and-air box structure 1 with any suitable type of outer cover and any suitable type and shape of frame to support my rubber-and-air box structure wherever luxury and comfort is wanted, but I have found that triangular-like air compartments 2 in combination with a suitable apertured frame part give the maximum luxury and safety when making use of this invention.

By means of this invention I provide a unitary structure device 1 which automatically adapts itself to function as a combined seat 9 and back support 10, see Figures 10, 11 and 12.

This invention also provides a rubber-and-air box luxury-giving structure 1 which is adapted to be positioned in a suitable frame part so that it is free to flex or yield more or less bodily, that is change its general shape, as well as flex or yield locally within its own structure in a novel manner giving new technical effects and great luxury seating advantages unobtainable by any other means.

My improved luxury-giving rubber-and-air box part 1 and its method of support may be used as a hammock or deck seat and be constructed and mounted so as to constitute a luxurious combined seat and back support in a one-unit structure, and my frame 11 or chair part 12 may have any suitable base foundation part, say strips of fabric fitments 13 or their equivalent, with or without aperture spaces, and be suitably positioned below my flexible cushion structure to say limit its safe or desired deflection on its apertured frame part 11 or 12.

My rubber-and-air box structure may also be manufactured for use on the back of a seat or such-like fitment in any well-known manner, and in all required shapes and dimensions to give luxury, comfort and safety where desired to the back part of a seat.

This invention may be used to form luxury-giving pillion seats for say motor-cycles and other small seats and foot-stools, mats or other such-like structures at a low production cost, and its adaptability for such work provides greater comfort under all conditions and particularly in speed travelling when say under severe travelling acceleration or braking or acute turning or other emergency conditions.

Improved lateral stability in combination with increased vertical deflection and increased shock absorbing qualities are obtained when wanted practically anywhere by means of this invention in all its useful applications for any given work.

My rubber-and-air box structure always automatically adapts itself to the user and automatically springs back or recovers its original form immediately the weight of the user is removed and retains its soft and luxurious cushioning deflection and comfort during a long life.

For certain purposes my rubber-and-air box part 1 may be constructed when required in its cross section more or less triangular-like, see Figures 11 and 12, and may have a sharp back end apex part 14 with a front blunt part 15 when wanted, in suitable dimensions. The top and back part of my luxury-giving rubber-and-air box structure when distorted by the weight of the user may move downwards say within its frame part, and when it forms a sloping or tilted rubber-and-air box seat part it is easily positioned on its, say, fabric, canvas or other fitments 13 and frame part 16 to permit maximum luxury and comfort to be obtained.

When a suitable frame part 11 or 12 is used the hollowed or other appropriate apertured hole or space 17 increases the vertical deflection and comfort of my rubber-and-air box structure.

As a further illustration of the wide range of utility of my rubber-and-air box device it may be manufactured for use in a bath to give comfort to the person sitting in said bath, being suitably positioned by means of the sides of the bath without requiring a frame part.

In this specification I have referred to "rubber and air cellular walls" and I wish it to be understood that what I means by "rubber and air cellular walls" are rubber walls which comprise innumerable cellular air formations within said walls.

My luxury-giving soft and light flexible rubber-and-air box structure and its frame part and other fitments may be manufactured in all required dimensions and shapes and of suitable materials.

Having now particularly described and ascertained the nature of my said invention and in what manner the same is to be performed I declare that what I claim is:—

In a seating device comprising a body of molded rubber having an upper flat top surface, a plurality of depending flanges connected together to provide a continuous outer wall and a series of interlocked and triangular shaped air chambers, the depending flanges adjacent the inner portion of the bottom projecting below the outer flanges to form a continuous wall, and a frame to support the outer triangular shaped air chambers, the said frame having an opening with a continuous depending flange within which to insert the inner triangular shaped air chambers with the continuous wall whereby the continuous flange registers with the continuous wall for holding the molded rubber body in proper alignment with the frame.

EDWARD BRICE KILLEN.